(12) United States Patent
Nakajima (10) Patent No.: US 9,996,928 B2
(45) Date of Patent: Jun. 12, 2018

(54) DISEASE DIAGNOSTIC APPARATUS, IMAGE PROCESSING METHOD IN THE SAME APPARATUS, AND MEDIUM STORING PROGRAM ASSOCIATED WITH THE SAME METHOD

(71) Applicant: CASIO COMPUTER CO., LTD., Shibuya-ku, Tokyo (JP)

(72) Inventor: Mitsuyasu Nakajima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/843,657

(22) Filed: Dec. 15, 2017

(65) Prior Publication Data

US 2018/0108129 A1    Apr. 19, 2018

Related U.S. Application Data

(62) Division of application No. 14/860,618, filed on Sep. 21, 2015.

(30) Foreign Application Priority Data

Nov. 7, 2014 (JP) .................................. 2014-227528
Nov. 7, 2014 (JP) .................................. 2014-227530

(51) Int. Cl.
*G06K 9/40* (2006.01)
*G06K 9/00* (2006.01)
(Continued)

(52) U.S. Cl.
CPC ............ *G06T 7/0012* (2013.01); *G06T 5/009* (2013.01); *G06T 7/11* (2017.01);
(Continued)

(58) Field of Classification Search
None
See application file for complete search history.

(56) References Cited

U.S. PATENT DOCUMENTS 5,241,468 A * 8/1993 Kenet .................. A61B 5/0059
382/128
7,720,266 B2 * 5/2010 Ni ....................... G01S 7/52034
378/37
(Continued)

FOREIGN PATENT DOCUMENTS

JP       63173182 A    7/1988
JP     2005192944 A    7/2005
(Continued)

OTHER PUBLICATIONS

European Office Action (in English) dated Apr. 19, 2017 issued in counterpart European Application No. 15186621.7.
(Continued)

*Primary Examiner* — Avinash Yentrapati
(74) *Attorney, Agent, or Firm* — Holtz, Holtz & Volek PC (57) ABSTRACT

An image processing method for diagnosing a disease using a captured image of an affected area, includes separating the captured image memorized into a brightness component and a color information component; separating the brightness component into a base component and a detail component; performing a highlighting process on the detail component; and restoring a brightness component from the base component and a highlighted detail component, and then generating a highlighted image using a restored brightness component and the color information component. The highlighting process includes highlighting the detail component depending on likelihood of vessel of a region to be diagnosed. In the highlighting process, the color information component that corresponds to a direction of a red-based color in a first color space is acquired; a predetermined range
(Continued)

of the color information component is normalized; and a likelihood (V) of vessel of the region as acquired via the normalization is reflected in a highlighting coefficient of the detail component to generate a highlighted detail component image.

9 Claims, 5 Drawing Sheets

(51) Int. Cl.
    *G06T 7/00* (2017.01)
    *G06T 7/11* (2017.01)
    *G06T 5/00* (2006.01)

(52) U.S. Cl.
    CPC .............. *G06T 2207/10024* (2013.01); *G06T 2207/10056* (2013.01); *G06T 2207/20028* (2013.01); *G06T 2207/30088* (2013.01); *G06T 2207/30096* (2013.01); *G06T 2207/30101* (2013.01)

(56) References Cited

U.S. PATENT DOCUMENTS

| | | | |
|---|---|---|---|
| 8,406,482 B1 * | 3/2013 | Chien | G06K 9/4652 382/115 |
| 2002/0176623 A1 | 11/2002 | Steinberg et al. | |
| 2003/0002736 A1 * | 1/2003 | Maruoka | G06T 5/009 382/168 |
| 2004/0151356 A1 * | 8/2004 | Li | G06K 9/527 382/131 |
| 2004/0190789 A1 * | 9/2004 | Liu | G06T 5/009 382/274 |
| 2004/0212815 A1 * | 10/2004 | Heeman | G06T 11/001 358/1.9 |
| 2005/0083347 A1 * | 4/2005 | Wilensky | G06T 5/003 345/606 |
| 2006/0093213 A1 * | 5/2006 | Steinberg | G06K 9/0061 382/167 |
| 2007/0080975 A1 | 4/2007 | Yamashita et al. | |
| 2007/0211959 A1 | 9/2007 | Hayaishi | |
| 2007/0237418 A1 * | 10/2007 | Toyoda | G06T 5/008 382/260 |
| 2008/0080766 A1 * | 4/2008 | Payonk | A45D 44/005 382/167 |
| 2008/0144962 A1 | 6/2008 | Jung et al. | |
| 2008/0260218 A1 | 10/2008 | Smith et al. | |
| 2008/0275315 A1 * | 11/2008 | Oka | A61B 5/0059 600/306 |
| 2009/0034824 A1 | 2/2009 | Li et al. | |
| 2009/0161953 A1 * | 6/2009 | Ciurea | H04N 1/4074 382/172 |
| 2010/0158330 A1 * | 6/2010 | Guissin | G06K 9/00369 382/128 |
| 2010/0195901 A1 * | 8/2010 | Andrus | H04N 5/213 382/162 |
| 2011/0096201 A1 * | 4/2011 | Yoo | G06T 5/007 348/235 |
| 2012/0301024 A1 * | 11/2012 | Yuan | H04N 1/624 382/167 |
| 2013/0279776 A1 | 10/2013 | Guissin et al. | |
| 2014/0285641 A1 | 9/2014 | Kato et al. | |
| 2015/0213619 A1 * | 7/2015 | Nakamura | A61B 5/0077 382/128 |
| 2015/0339817 A1 * | 11/2015 | Kuriyama | G06T 1/0007 348/71 |
| 2015/0379712 A1 | 12/2015 | Guissin et al. | |
| 2016/0014328 A1 | 1/2016 | Rokutanda | |
| 2016/0133009 A1 | 5/2016 | Hamada et al. | |
| 2016/0133010 A1 | 5/2016 | Hamada et al. | |

FOREIGN PATENT DOCUMENTS

| | | |
|---|---|---|
| WO | 2007031946 A2 | 3/2007 |
| WO | 2014027522 A1 | 2/2014 |
| WO | 2014057618 A1 | 4/2014 |
| WO | 2014119047 A1 | 8/2014 |
| WO | 2014155782 A1 | 10/2014 |
| WO | 2014172671 A1 | 10/2014 |

OTHER PUBLICATIONS

Extended European Search Report (EESR) dated Apr. 19, 2017 issued in counterpart European divisional Application No. 16203645.3.
Extended European Search Report dated May 11, 2016, issued in counterpart European Application No. 15186621.7.
Japanese Office Action (and English translation thereof) dated Aug. 1, 2017 issued in Japanese Application No. 2016-124922.
Japanese Office Action (and English translation thereof) dated Jul. 29, 2016, issued in counterpart Japanese Application No. 2014-227530.
Japanese Office Action (and English translation thereof) dated May 31, 2016, issued in counterpart Japanese Application No. 2014-227528.
Japanese Office Action (and English translation thereof) dated May 31, 2016, issued in counterpart Japanese Application No. 2014-227530.
Toshitsugu Sato, et al., "Improved Detection of Dermoscopic Structures by High Dynamic Range Image Conversion", Japanese Journal of Dermatology, vol. 123, No. 2, Feb. 2013, pp. 121-131.
Yandow-Reilly, et al., "Unsupervised Skin Lesion Classification and Matching", RIT Scholar Works, Feb. 1, 2003, pp. 1-48, XP055261424.
Shenton, et al., "Harvard Brain Atlas: a Teaching and Visualization Tool", Biomedical Visualization, Oct. 30, 1995. IEEE Computer Society, pp. 10-17, 81, XP010196687.
Koehler, et al., "Non-invasive imaging techniques in the diagnosis of skin diseases", Expert Opinion on Medical Diagnostics, Informa Healthcare, UK, vol. 5, No. 5, Sep. 1, 2011, pp. 425-440, XP009171403.
U.S. Appl. No. 14/860,581; First Named Inventor: Akira Hamada; Title: "Disease Diagnostic Apparatus, Image Processing Method in the Same Apparatus, and Medium Storing Program Associated With the Same Method"; Filed: Sep. 21, 2015.
U.S. Appl. No. 14/860,603; First Named Inventor: Akira Hamada; Title: "Disease Diagnostic Apparatus, Image Processing Method in the Same Apparatus, and Medium Storing Program Associated With the Same Method"; Filed: Sep. 21, 2015.
Bovik, et al., "Handbook of Image and Video Processing", Jan. 1, 2000, AP, pp. 26-27 and 95-97, XP 002756272.
Cheng, et al., "Adaptive synthetic aperture radar image enhancement", SPIE—International Society for Optical Engineering. Proceedings, vol. 7494, Oct. 30, 2009 (Oct. 30, 2009), p. 749426.
Fischer, "Analysis of Skin Lesions with Pigmented Networks", Proceedings of the international conference in image processing (ICIP) Lausanne, Sep. 16-19, 1996: vol. 1, Sep. 16, 1996, pp. 323-326, XP002381197.
Haiyan, et al., "An Integrated Bilateral and Unsharp Masking Filter for Image Contrast Enhancement", 2013 International Conference on Machine Learning and Cybernetics, IEEE, vol. 2, Jul. 14, 2013, pp. 907-912, XP032637586.

\* cited by examiner

DISEASE DIAGNOSTIC APPARATUS, IMAGE PROCESSING METHOD IN THE SAME APPARATUS, AND MEDIUM STORING PROGRAM ASSOCIATED WITH THE SAME METHOD

CROSS-REFERENCE TO RELATED APPLICATIONS

The present application is a Divisional application of U.S. Ser. No. 14/860,618, filed Sep. 21, 2015, which claims the priority of both Japanese Patent Application No. 2014-227528 and No. 2014-227530 filed on Nov. 7, 2014, all of which are incorporated herein by reference.

TECHNICAL FIELD

The present invention relates to a disease diagnostic apparatus, an image processing method in the same apparatus, and a medium storing a program associated with the same method.

BACKGROUND ART

Generally, visual inspection is necessarily performed to diagnose a cutaneous legion, thereby obtaining an amount of information. However, not only discrimination between a mole and a spot but also discrimination between a benign tumor and a malignant tumor are substantially difficult with a naked eye inspection and even a magnifying glass inspection. For the reasons, dermoscopic inspection in which a dermoscope-equipped camera is used to capture an image of a disease has been conventionally performed.

The dermascope is a noninvasive diagnostic device in which a disease irradiated with light from, for example, a halogen lamp, and unobstructed by reflective light due to echo gel or a polarization filter is magnified (typically ×10) and subjected to observation. A dermoscopic diagnosis can be defined as the inspection of skin diseases with the dermoscope. For more detail, see internet URL (http://www.twmu.ac.jp/DNH/department/dermatology/dermoscopy.html) (accessed on Sep. 1, 2014). In accordance with the dermoscopic diagnosis, scattered reflection occurring due to a cuticle is eliminated, thereby rendering the distribution of pigmentation from an epidermis to a superficial intradermal layer increasingly visible.

For example, Patent Literature 1 (Japanese patent publication No. 2005-192944 (A)) discloses technologies of a remote diagnosis apparatus of diagnosing a pigmented skin disease employing a value such as color, a texture, an asymmetricity, and a circularity based on an image of a skin captured by the dermoscope. In accordance with Patent Literature 1, a portable phone provided with a dermoscope-equipped camera is used, and an image of a skin having a disease of a benign nevus pigmentosus and etc. and having a risk of a melanoma is captured by the dermoscope. The portable phone is connected to an internet due to its network connecting function, and the image of the skin captured is transmitted via the internet to the remote diagnosis apparatus to request a diagnosis. Upon receiving the image of the skin based on the request, the remote diagnosis apparatus uses a melanoma diagnosis program to determine whether based on the image of the skin the disease is a melanoma or not, or in a case where the disease is the melanoma, which stage of the melanoma is. The determination as a result is transmitted to a physician having requested the diagnosis.

While diagnosis that is performed based on the aforementioned dermoscopic image has become widely used, clear shape change or feature is often difficult to obtain. In addition, an observation of the image and a determination of a disease actually depend on a skill of a physician or clinician. For the reasons, a tool allowing for easy and accurate diagnosis based on image processing technologies of, for example, highlighting a disease portion in the dermoscopic image, has been desired.

CITATION LIST

Patent Literature

[Patent Literature 1] Japanese patent publication No. 2005-192944 (A)

SUMMARY OF INVENTION

In accordance with a first aspect of the invention, there is provided an image processing method in a diagnostic apparatus of diagnosing a disease using a captured image of an affected area, comprising: a first separating step of separating the captured image memorized into a brightness component and a color information component; a second separating step of separating the brightness component into a base component and a detail component; a highlighting step of performing a highlighting process on the base component and/or the detail component; and a generating step of restoring a brightness component from a highlighted base component and the detail component, and/or from the base component and a highlighted detail component, and then generating a highlighted image using the restored brightness component and the color information component.

In accordance with a second aspect of the invention, there is provided with a diagnostic apparatus of diagnosing a disease using a captured image of an affected area, comprising: an image-memorizing unit configured to memorize the captured image; and a processing unit configured to process the captured image memorized in the image-memorizing unit, the processing unit comprising: a first separating means configured to separate the captured image into a brightness component and a color information component; a second separating means configured to separate the brightness component into a base component and a detail component; a highlighting means to configured to perform a highlighting process on the base component and/or the detail component; and a generating means to configured to restore a brightness component from a highlighted base component and the detail component, and/or from the base component and a highlighted detail component, and use the restored brightness component and the color information component to generate a highlighted image.

In accordance with a third aspect of the invention, there is provided a non-transitory computer readable medium storing a program of processing an image in a diagnostic apparatus of diagnosing a disease using a captured image of an affected area, the program causing a computer to execute: a first separating step of separating the captured image memorized into a brightness component and a color information component; a second separating step of separating the brightness component into a base component and a detail component; a highlighting step of performing a highlighting process on the base component and/or the detail component; and a genarating step of restoring a brightness component from a highlighted base component and the detail component, and/or from the base component and a highlighted detail component, and then generating a highlighted image using the restored brightness component and the color information component.

DESCRIPTION OF EMBODIMENTS

Referring to the accompanying drawings, Embodiments of the invention will be hereinafter described in detail. Furthermore, the same reference numeral is assigned to the same element or part throughout the overall specification.

First Embodiment

Figure 1:
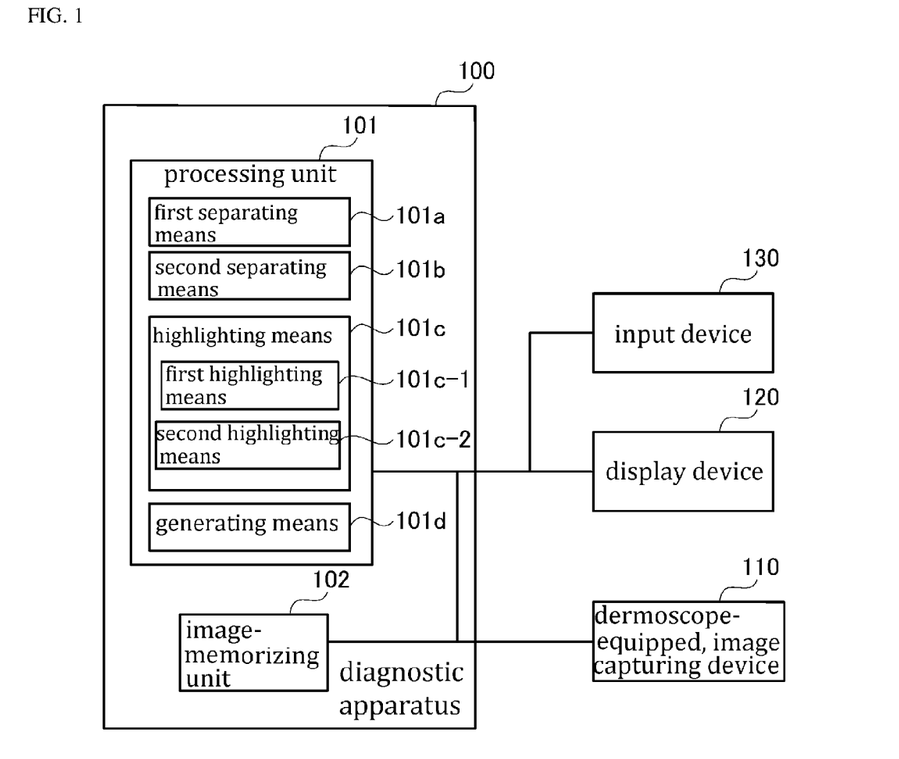
FIG. 1 is a block diagram showing a configuration of First Embodiment of a diagnostic apparatus in accordance with the present invention.

FIG. 1 is a block diagram showing a configuration of a diagnostic apparatus 100 in accordance with First Embodiment of the present invention. Referring to FIG. 1, an image-capturing device 110 equipped with a dermoscope, which can be hereinafter designated as an "image-capturing device 110" or "dermoscope-equipped, image-capturing device 110" throughout the specification, is connected to the diagnostic apparatus 100. The dermoscope-equipped, image-capturing device 110 is configured to capture an image of an affected area in accordance with an instruction from the diagnostic apparatus 100 (in particular, a processing unit 101), memorize the captured image such as a dermoscopic image in an image-memorizing unit 102, and display the captured image on a predetermined area of a display device 120. Furthermore, the captured image is highlighted by the processing unit 101, and then memorized in the image-memorizing unit 102 and displayed on the predetermined area of the display device 120. An input device 130 is configured to perform an instruction for starting to capture an image such as a dermoscopic image, and selection of a region in the dermoscopic image, which will be described below.

The display device 120 may be a LCD (Liquid Crystal Display) monitor, and the input device 130 may be a mouse.

The processing unit 101 is configured to process the captured image memorized in the image-memorizing unit 102. Referring to FIG. 1, the processing unit 101 has a first separating means 101a, a second separating means 101b, a highlighting means 101c, and a generating means 101d.

The first separating means 101a function as means for separating the captured image into a brightness component and a color information component. The second separating means 101b function as means for separating the brightness component into a base component (also called a large-scale component) and a detail component.

The highlighting means 101c function as means for performing highlighting process on the base component, and has an either of a first highlighting means 101c-1 configured to compress the base component in a manner brighter than the center value or a second highlighting means 101c-2 configured to perform sharpness filtering process on the base component. The generating means 101d function as means for restoring a brightness from the highlighted base component and the detail component and using the color information component to generate a highlighted image.

Furthermore, the first highlighting means 101c-1 function as means for performing highlighting process on the base component image, which is separated from the brightness component by the second separating means 101b, using a power of a coefficient of 1 or below such that a maximum and a minimum which the base component image may have are not changed before and after the highlighting process. Furthermore, the second highlighting means 101c-2 function as means for generating a compressed image that is obtained by compressing the base component more brightly than the center value and performing a predetermined convolution operation of a predetermined convolution coefficient on the generated, compressed image to perform a sharpness filtering process.

Each of the first separating means 101a, the second separating means 101b, the highlighting means 101c (the first highlighting means 101c-1, the second highlighting means 101c-2), and the generating means 101d as described above can execute the afore-mentioned original function thereof by the processing unit 101's sequentially reading a program in accordance with First Embodiment of the present invention, owned by the processing unit 101.

Operation of First Embodiment

The operation of the diagnostic apparatus 100 in accordance with First Embodiment of the present invention as shown in FIG. 1 is described in detail with the following examples with reference to FIG. 2 and below.

Figure 2:
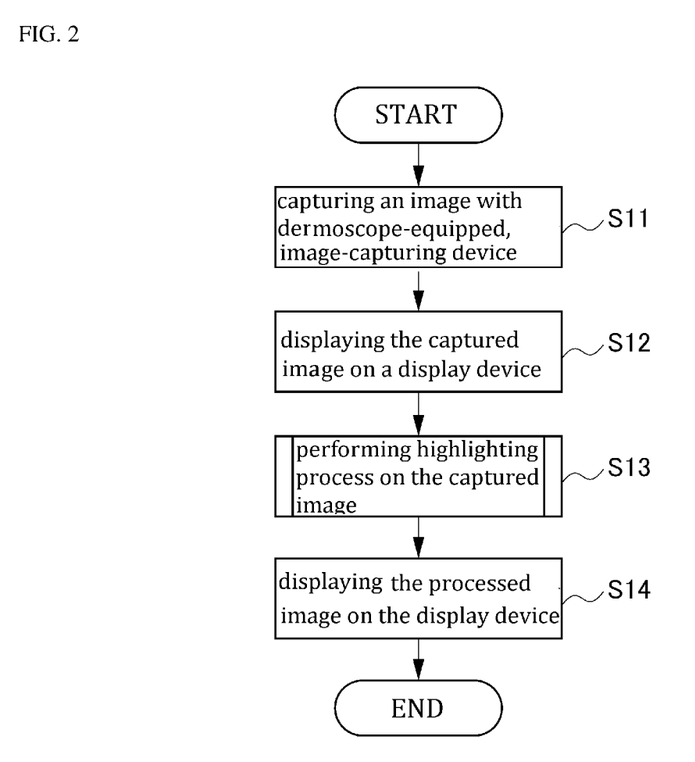
FIG. 2 is a flow chart illustrating a basic processing operation of a diagnostic apparatus of First Embodiment and Second Embodiment in accordance with the present invention.

FIG. 2 depicts the flow of basic processing operation of the diagnostic apparatus 100 in accordance with First Embodiment. Referring to FIG. 2, the processing unit 101 firstly acquires an image of an affected area (i.e., an area of skin legion) that is captured by the dermoscope-equipped, image-capturing device 110 (Step S11). Then, the captured image as acquired is memorized in the predetermined area of the image-memorizing unit 102, and is displayed on the display device 120 (Step S12). Subsequently, the processing unit 101 performs highlighting process on the captured image (Step S13). The highlighted image and the captured image as previously displayed are displayed in parallel on the display device 120. Determination is left to a physician (Step S14).

Figure 5:
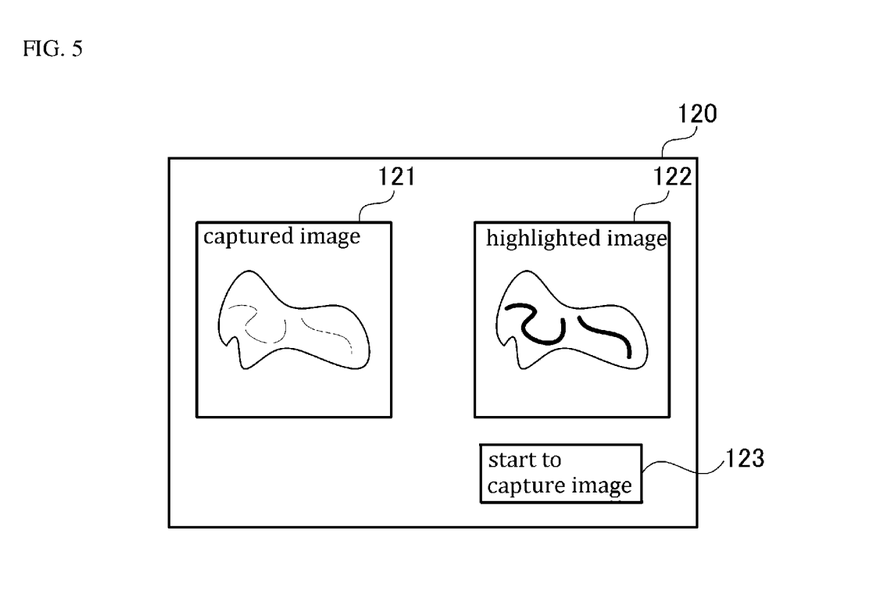
FIG. 5 shows an exemplary display screen configuration of a diagnostic apparatus of First Embodiment and Second Embodiment in accordance with the present invention.

An exemplary image of a display screen displayed on the display device 120 is shown in FIG. 5. In the screen of FIG. 5, a captured image-displaying section 121 is arranged at a left side and a highlighted image-displaying section 122 in which the highlighted image such as the highlighted image of vessel is shown is arranged at a right side. For example, upon the physician's clicking a button 123 of "start to capture image" which is located at a bottom right of the screen, the dermoscope-equipped, image-capturing device 110 starts to capture the image of the affected area. By the processing unit 101 the captured image and the highlighted image, for example, the highlighted image of vessel region out of the captured images, are respectively displayed in the sections 121 and 122 arranged in parallel.

Figure 3:
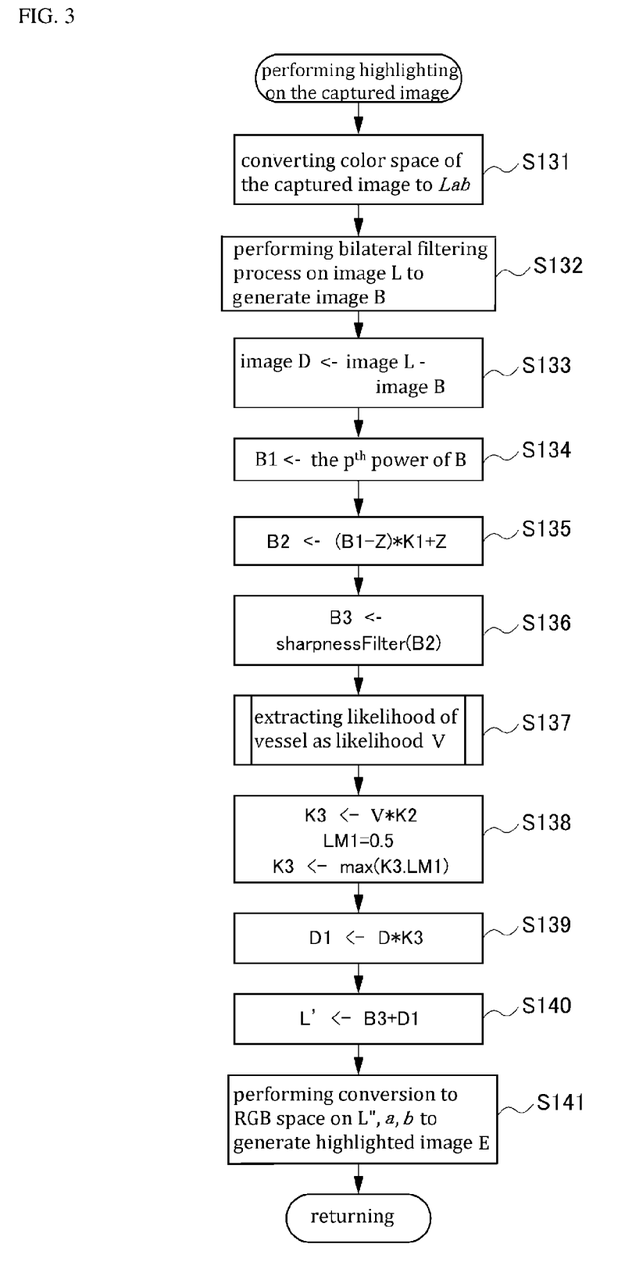
FIG. 3 is a flow chart illustrating the details of an operation of highlighting a captured image in FIG. 2.

The details of the image-highlighting procedure as defined in Step S13 of FIG. 2 are shown in FIG. 3. In this regard, the processing unit 101 separates the captured image of the affected area captured by the dermoscope-equipped, image-capturing device 110 into a base component and a detail component, and performs highlighting process on the base component and the detail component in a different manner It is noted that the highlighting process can be performed on any one of the base component and the detail component, although FIG. 3 shows that the highlighting process is performed sequentially on both thereof.

Specifically, the processing unit 101 firstly performs color space conversion. The processing unit 101, in particular the first separating means 101a, converts the captured image of RGB color space that is acquired by the dermoscope-equipped, image-capturing device 110 to the captured image of CIE Lab color space, which may be hereinafter designated as Lab color space or CIE 1976 L*a*b* color space (Step S131). The details of the Lab color space are described in, for example, internet URL (http://Ja.wikipedia.org/wiki/Lab%E8%89%B2%E7%A9%BA%E9%96%93) (accessed on Sep. 1, 2014)

Subsequently, the second separating means 101b of the processing unit 101 perform edge preserving filtering process on an image L so as to separate the brightness component into the base component and the detail component (Step S132). An edge preserving filter which can be used in this filtering process may be a bilateral filter. The details of the bilateral filter are described in, for example, internet URL (http://en.wikipedia.org/wiki/Bilateral filter) (accessed on Sep. 1, 2014).

Next, the processing unit 101 (the highlighting means 101c) acquires an image B (B=bilateral filter (L)) that can be obtained via by performing the bilateral filtering process on the image L. In this regard, the image B corresponds to the base component. Next, the highlighting means 101c acquire an image D corresponding to the detail component. The image D can be acquired by subtracting the image B from the image L (Step S133).

Subsequently, the highlighting means 101c (the first highlighting means 101c-1) acquire a highlighted base component image B1 by raising the base component image B to the $p^{th}$ power (Step S134). In this regard, p is 1 or below. The highlighting means 101c perform the highlighting process such that a maximum and a minimum which the base component image B may have are not changed before and after modification. Specifically, since the value of a L axis in Lab color space is in a range of from 0 to 100, B1 can be determined in accordance with the following mathematical formula: $B1=(B\wedge p)/(100\wedge p)*100$. Next, the highlighting means 101c multiply B1 by K1 employing the value Z as a basis so as to acquire a compressed image B2 (Step 135).

The compressed image B2 can be determined in accordance with the following mathematical formula: $B2=(B1-Z)*K1+Z$. In the above mathematical formula, a coefficient K1 represents a compression ratio of 1 or below, in First Embodiment, a range of from 0.2 to about 0.8. Z is set brighter than a center C. C is a center location where the compression is performed, and can be calculated in accordance with the following mathematical formula: $C=(50\wedge p)/(100\wedge p)*100$. Z has a value of from 5% to 50% greater than that of C. In other words, the highlighting means 101c compress the base component in a manner brighter than the center value so as to highlight the base component.

Next, the highlighting means 101c (the second highlighting means 101c-2) perform sharpness filtering process on the compressed image B2 to generate a sharpened image B3 (Step S136: B3←sharpness filter (B2)). During the sharpness filtering process, the second highlighting means 101c-2 perform convolution operation of the following kenel M on the compressed image B2. Furthermore, one exemplary convolution matrix (value of convolution kenel M) is shown, as follow:

| |−0.1667 | −0.6667 | −0.1667| |
|---|---|---|
| M = |−0.6667 | 4.3333 | −0.6667| |
| |−0.1667 | −0.6667 | −0.1667| |

In First Embodiment, the afore-mentioned compression highlighting process is performed by the first highlighting means 101c-1, and the subsequent sharpness filtering process is performed by the second highlighting means 101c-2. The highlighting means 101c does not necessarily perform both of the compression highlighting process and the sharpness filtering process, and may perform either of the compression highlighting process or the sharpness filtering process.

Next, the highlighting means 101c extract likeness of vessel as a likelihood V so as to perform a process of reflecting the likeness of vessel in a degree of highlighting the detail component image D (Step S137). The likeness of vessel (the likelihood V) has the same dimensional information as the compressed image B2 of the base component in which noise has been removed, and has the likeness of vessel information (the likelihood V) ranging from 0 to 1 for each pixel. As the likeness of vessel increases, the value approaches 1. The process of extracting the likeness of vessel as the likelihood V as defined in Step S137 will be described in the flow chart of FIG. 4.

Figure 4:
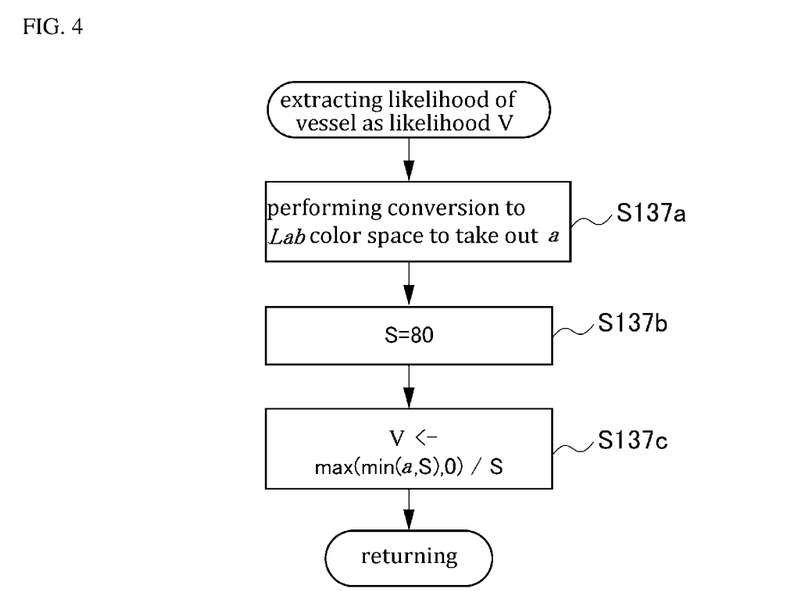
FIG. 4 is a flow chart illustrating the details of an operation of extracting likeness of a vessel in FIG. 3.

Referring to FIG. 4, the highlighting means 101c acquire the value of an a axis that corresponds to a direction of red-based color in Lab color space (Step S137a), and with respect to the likeness of vessel (the likelihood V), set the value of the a within the range of from 0 to 1 via normalization with the limited range of from 0 to S (Step S137b, Step S137c). In this regard, S is, for example, 80. In First Embodiment, the normalization is performed with limitation of the value of from 0 to 80. However, the above value is only non-restrictive example. Furthermore, while in First Embodiment the value of the a axis corresponding to the direction of red-based color direction in the Lab color space is acquired to perform the highlighting process on the likeness of vessel (the likelihood V), a value of a b axis corresponding to a direction of blue-based color in the Lab color space may be acquired to perform the highlighting process on a likeness of skin disease.

Returning to FIG. 3, after determining the likeness of vessel as the likelihood V, as described above (Step S137), the highlighting means 101c determine a highlighting coefficient K3 of the detail component image D using the likelihood V (Step S138). The highlighting coefficient K3 can be determined in accordance with the following mathematical formula: $K3=V*K2$. In the above mathematical formula, a lower limit of the highlighting coefficient K3 is obtained by multiplying the coefficient K2 by LM1. In the above mathematical formula, LM1 has a range of from 0 to 1, and may be, for example, 0.5. In other words, K3 can be represented by the following mathematical formula: $K3=\max(K3, LM1)$. In the above mathematical formula, "max ( )" is a function returning maximum of two factors per an element. Since "LM1" is a scalar, it is subjected to expansion with the same value and dimension as the highlighting coefficient K3.

Subsequently, the highlighting means 101c perform the highlighting process on the detail component image D using the highlighting coefficient K3 to generate the highlighted image D1 of the detail component image D (Step S139). In other words, the highlighted image D1 can be determined in accordance with the following mathematical formula: D1=D*K3. In the above mathematical formula, "*" represents a multiplication per an element.

Subsequently, the processing unit 101 (the generating means 101d) adds the highlighted (modified) base component image B1 to the highlighted (modified) detail component image D1 to acquire a modified brightness image L" (L"=B3+D1) (Step S140). Subsequently, based on the acquired, modified brightness image L", the value of the a axis corresponding to red-based color component and the value of the b axis corresponding to blue-based color component, conversion to RGB color space is performed to generate an ultimate highlighted image E (Step S141). In other words, the generating means 101d restore the brightness from the highlighted base component image and the detail component image, and use the color information component to generate the highlighted image. Furthermore, as shown in the display screen of FIG. 5, the processing unit 101 displays the captured image-displaying section 121 and the highlighted image-displaying section 122 in parallel.

Furthermore, as described above, the highlighting means 101c can perform the highlighting process on either of the base component or the detail component. In more detail, the base component is subjected to the highlighting process via brighter compression or the sharpness filtering process, and the detail component is subjected to the highlighting process depending on the likeness of vessel. In this regard, the generating means 101d does not necessarily both of the highlighted base component and the highlighted detail component, and can restore the brightness from at least one of the highlighted base component and the highlighted detail component. For example, the generating means 101d may add the base component that is highlighted by the highlighting means 101c (image B2 or B3) to the detail component that is separated by the second separating means 101b (image D) to acquire the modified brightness image L".

Effect of First Embodiment

In accordance with the diagnostic apparatus 100 directed to First Embodiment of the present invention, the processing unit 101 separates the captured image memorized in the image-memorizing unit 102 into the brightness component and the color information component; separates the brightness component into the base component and the detail component; performs the compression on the base component in a manner brighter than the center value or performs the sharpness filtering process on the base component; and restores the brightness from the highlighted base component and the detail component; uses the color information component to generate the highlighted image. For the above configuration, as shown in the display screen of, for example, FIG. 5, the captured image-displaying section 121 and the highlighted image-displaying section 122 can be displayed in parallel. In this regard, if the base component is highlighted such that it is subjected to compression in a manner brighter than the center value, the color of the vessel is maintained. On the other hand, if the base component is highlighted such that it is subjected to the sharpness filtering process, the base component in the image becomes sharp without being accompanied by any increase in minute noise. For the reasons, the physician can visually check a clear image with respect to the linear vessel or punctate vessel, thereby causing the physician to make an easy and correct diagnosis. As a result, diagnostic accuracy is improved.

In First Embodiment, the diagnostic apparatus 100 uses the bilateral filter to separate the brightness component into the base component and the detail component. However, the bilateral filter may be replaced with other edge preserving smoothing filter such as an epsilon filter. Furthermore, while in First Embodiment the captured image and the highlighted image are displayed in parallel, the same effect can be attained by switching and displaying the captured image/the highlighted image on the same screen. Furthermore, while in First Embodiment the Lab color space is used to acquire the brightness image, a brightness signal Y in YUV color space that is represented by the brightness signal and two color difference signals may be used without use of the Lab color space. Regarding the YUV color space, see internet URL: https://ja.wikipedia.org/wiki/YUV (accessed on Sep. 1, 2014).

Furthermore, in First Embodiment the diagnostic apparatus 100 uses the a axis of the Lab color space as the likeness of vessel (likelihood V), it may use an axis that is obtained by rotating the a axis in a plus direction of the b axis about (a1, b1). In this case, a1 may a value of from 10 to 50, b1 may be 0, and the amount of rotation may be from about 0.3 to 0.8 radian.

Second Embodiment

Configuration and Operation of Second Embodiment

Figure 6:
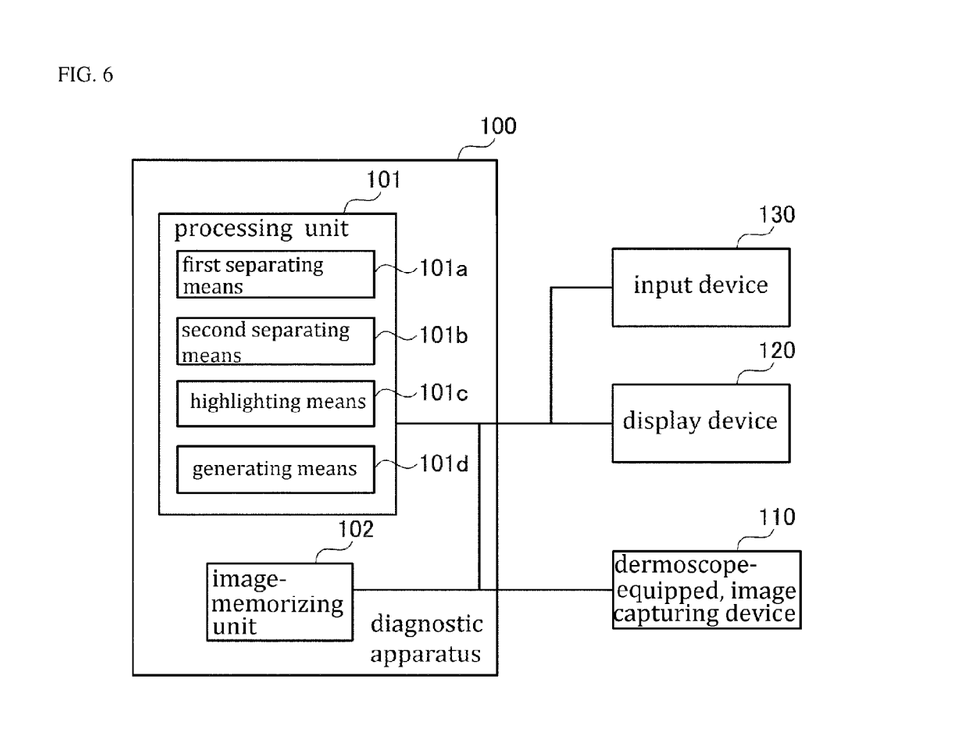
FIG. 6 is a block diagram showing a configuration of a diagnostic apparatus in accordance with Second Embodiment of the present invention

FIG. 6 is a block diagram showing a configuration of a diagnostic apparatus 100 in accordance with Second Embodiment of the present invention. As shown in FIG. 6, the configuration of the diagnostic apparatus 100 in accordance with Second Embodiment is equal to that of the diagnostic apparatus 100 in accordance with First Embodiment except that it may be provided with one highlighting means 101c. The characteristics of Second Embodiment will be described below.

The highlighting means 101c of Second Embodiment is different from the highlighting means 101c of First Embodiment in that they perform highlighting process on the detail component depending on the likeness of the region to be diagnosed. In First Embodiment, the highlighting means 101c perform the highlighting process on the base component and both of the base component and the detail component. In Second Embodiment, the highlighting means 101c may acquire the color information component that corresponds to a direction of red-based color in a first color space (CIE Lab color space), normalize a predetermined range of the color information component, and reflect a likeness of the region as acquired via the normalization in a highlighting coefficient of the detail component to generate the highlighted detail component image.

The generating means 101d function as means for adding the base component obtained by the second separating means to the detail component highlighted by the highlighting means 101c to restore the brightness, and performing a conversion to a second color space (RGB color space) based on the restored brightness, the direction of red-based color and the direction of blue-based color of the first color space (CIE Lab color space) to generate the highlighted image.

Each of the first separating means 101a, the second separating means 101b, the highlighting means 101c and the generating means 101d as described above can execute the afore-mentioned original function thereof by the processing unit 101's sequentially reading a program in accordance with Second Embodiment of the present invention, owned by the processing unit 101.

Since the operation of the diagnostic apparatus 100 in accordance with Second Embodiment is equal to that of the diagnostic apparatus 100 in accordance with First Embodiment in the highlighting process of the detail component, the detailed description in this regard is omitted. Furthermore, Second Embodiment shares FIGS. 2 to 5 with First Embodiment.

Furthermore, while as mentioned above the highlighting means 101c can perform highlighting process on either the base component or the detail component, in Second Embodiment the highlighting process is performed on the detail component depending on the likeness of vessel. Then, the generating means 101d can add the base component (image B) obtained by the second separating means 101b to the detail component (image D1) highlighted by the highlighting means 101c so as to generate the modified brightness image L".

Effect of Second Embodiment

In accordance with the diagnostic apparatus 100 in accordance with Second Embodiment, the processing unit 101 separates the captured image memorized in the image-memorizing unit 102 into the brightness component and the color information component, and separates the brightness component into the base component and the detail component; the highlighting means 101c perform the highlighting process on the detail component depending on the likeness of the region to be diagnosed; and the generating means 101d restore the brightness from the base component and the highlighted detail component and use the color information component to generate the highlighted image. As a result, as shown in the display screen of, for example, FIG. 5, the captured image-displaying section 121 and the highlighted image-displaying section 122 can be displayed in parallel. As the detail component is highlighted depending on the likeness of vessel, the periphery of the vessel becomes sharp without being accompanied by change in overall degree of noise. Accordingly, the physician can visually check the screen that is clear than the captured image with respect to the linear vessel and punctate vessel, thereby causing the physician to make an easy and correct diagnosis. Therefore, diagnostic accuracy is improved.

While in Second Embodiment the captured image is converted from the RGB color space to the Lab color space and then processed, the captured image may be converted from the RGB color space to a HSV (Hue, Saturation, Lightness) color space and then processed. In this case, V component corresponds to the brightness component, and the HS component corresponds to the color information component. The HSV color space is a color space consisting of three components, that is, the HSV color space has hue, saturation (chroma), and value (lightness or brightness). The HSV color space can be also called as HSL (Hue, Saturation, Lightness) color space or HSB (Hue, Saturation, Brightness) color space.

The above two embodiments are given to illustrate the scope and spirit of the instant invention. These embodiments and examples will make apparent, to those skilled in the art, other embodiments and examples. These other embodiments and examples are within the contemplation of the present invention. Therefore, the instant invention should be limited only by the appended claims.

100 . . . diagnotic apparatus; 101 . . . processing unit; 101a . . . first separating means; 101b . . . second separating means; 101c . . . highlighting means; 101d . . . extracting means; 110 . . . dermoscope-equipped, image-capturing device; 120 . . . display device; 121 . . . captured image-displaying section; 122 . . . highlight image-displaying section; 130 . . . input device

The invention claimed is:

1. An image processing method for a diagnostic apparatus for diagnosing a disease using a captured image of an affected area, the method comprising:
    separating the captured image into a brightness component and a color information component;
    separating the brightness component into a base component and a detail component;
    performing a highlighting process on the detail component;
    restoring the brightness component from the base component and the highlighted detail component; and
    generating a highlighted image using the restored brightness component and the color information component;
    wherein performing the highlighting process comprises:
        acquiring the color information component that corresponds to a direction of a red-based color in a first color space;
        normalizing a predetermined range of the acquired color information component; and
        reflecting, in a highlighting coefficient of the detail component, a likelihood of a vessel of a region to be diagnosed as acquired via the normalization, to generate a highlighted detail component image.

2. The method according to claim 1, wherein the brightness component is restored by adding the base component to the highlighted detail component, and
    wherein based on the restored brightness component, and the color information component corresponding to the direction of a red-based color and a direction of a blue-based color in the first color space, a conversion to a second color space is performed to generate the highlighted image.

3. The method according to claim 2, wherein the first color space is a CIE Lab color space, and wherein the second color space is a RGB color space.

4. A diagnostic apparatus for diagnosing a disease using a captured image of an affected area, the apparatus comprising:
    a memory configured to store the captured image; and
    a processor configured to perform operations comprising:
    separating the captured image stored in the memory into a brightness component and a color information component;
    separating the brightness component into a base component and a detail component;
    performing a highlighting process on the detail component;
    restoring the brightness component from the base component and the highlighted detail component; and
    generating a highlighted image using the restored brightness component and the color information component;
    wherein performing the highlighting process comprises:
        acquiring the color information component that corresponds to a direction of a red-based color in a first color space;

normalizing a predetermined range of the acquired color information component; and reflecting, in a highlighting coefficient of the detail component, a likelihood of a vessel of a region to be diagnosed as acquired via the normalization, to generate a highlighted detail component image.

5. The apparatus according to claim 4, wherein the processor restores the brightness component by adding the base component to the highlighted detail component, and wherein based on the restored brightness component, and the color information component corresponding to the direction of a red-based color and a direction of a blue-based color in the first color space, the processor performs a conversion to a second color space to generate the highlighted image.

6. The apparatus according to claim 5, wherein the first color space is a CIE Lab color space, and wherein the second color space is a RGB color space.

7. A non-transitory computer readable medium storing a program that is executable by a computer of a diagnostic apparatus for diagnosing a disease using a captured image of an affected area, the program being executable by the computer to perform operations comprising:

separating the captured image into a brightness component and a color information component;

separating the brightness component into a base component and a detail component;

performing a highlighting process on the detail component;

restoring the brightness component from the base component and the highlighted detail component; and generating a highlighted image using the restored brightness component and the color information component;

wherein performing the highlighting process comprises:
acquiring the color information component that corresponds to a direction of a red-based color in a first color space;

normalizing a predetermined range of the acquired color information component; and reflecting, in a highlighting coefficient of the detail component, a likelihood of a vessel of a region to be diagnosed as acquired via the normalization, to generate a highlighted detail component image.

8. The non-transitory computer readable medium according to claim 7, wherein the brightness component is restored by adding the base component to the highlighted detail component, and wherein based on the restored brightness component, and the color information component corresponding to the direction of a red-based color and a direction of a blue-based color in the first color space, a conversion to a second color space is performed to generate the highlighted image.

9. The non-transitory computer readable medium according to claim 8, wherein the first color space is a CIE Lab color space, and wherein the second color space is a RGB color space.

* * * * *